United States Patent

[11] 3,582,622

| [72] | Inventor | Nobuo Okuda |
| | | Yokohama-shi, Japan |
| [21] | Appl. No. | 708,413 |
| [22] | Filed | Feb. 26, 1968 |
| [45] | Patented | June 1, 1971 |
| [73] | Assignee | Tokyo Shibaura Electric Co., Ltd |
| | | Kawasaki-shi, Japan |
| [32] | Priority | Feb. 28, 1967 |
| [33] | | Japan |
| [31] | | 42/12438 |

[54] INTERPOLATER FOR NUMERICAL CONTROL SYSTEMS
7 Claims, 10 Drawing Figs.

[52] U.S. Cl. ........................................................ 235/151.11,
                                               235/150.31, 235/152
[51] Int. Cl. ....................................................... G06f 15/46,
                                                         G05b 19/18
[50] Field of Search ........................................... 235/151.11,
                                               152, 92, 150.3, 150.31

[56]                References Cited
                 UNITED STATES PATENTS
| 3,128,374 | 4/1964 | Yu Chi Ho et al. ........... | 235/152X |
| 3,213,444 | 10/1965 | Freeman et al. ............... | 235/150.3X |
| 3,254,203 | 5/1966 | Kveim ......................... | 235/151.11X |

*Primary Examiner*—Eugene G. Botz
*Assistant Examiner*—Felix D. Gruber
*Attorney*—George B. Oujevolk ABSTRACT: Time pulses to be applied to a digital differential analyzer are intermittently eliminated by a gate circuit controlled by a reset input of a flip-flop circuit. The reset terminal of the flip-flop circuit receives speed control pulses corresponding to a predetermined machining speed and the set terminal thereof receives an output from an integrator having a register with contents in accordance with a machining distance of a machine tool. As an integral output corresponding to said register contents is obtained from the integrator, the clock pulses can be intermittently eliminated in a manner inversely proportional to the machining distance, thus providing a constant machining speed.

PATENTED JUN 1 1971
3,582,622
SHEET 1 OF 5

Nobuo Okuda
*INVENTOR.*
BY George B. Oujevolk
*Attorney*

INTERPOLATER FOR NUMERICAL CONTROL SYSTEMS

BACKGROUND OF THE INVENTION

This invention relates to an interpolator for a numerical control system, and more particularly to an interpolator device capable of always furnishing a nearly constant working speed to numerical control systems regardless of the working length. In a general numerical interpolator or control device which is applied, for example, to a machine tool, a digital differential analyzer type of control is required. The detailed construction and the operation of a digital differential analyzer are presented in many technical text books, for example, Harry D. Huskey & Granino A. Korn "Computer Handbook," chapter 19, McGraw-Hill Book Company, 1962. This analyzer possesses integrators which are fabricated in such a way as to act as a function generator which generates for example linear or circular function signals, and the output pulse train thus obtained is fed, for example, to pulse motor means which drives the cutter of the machine tool in a linear or circular trace, thereby to obtain a desired finished product. To have the integrator drive the machine tool in this manner, as shown in FIG. 1 for example, a Y register 1 having contents $y$, to which an input incremental signal $\Delta y$ is fed is provided, and this Y register 1 will either add or substract an increment +1 to its contents depending upon the input signal $\Delta y$ being of the value $\Delta y = +1$ or $\Delta y = -1$. Moreover, a gate circuit 2 is connected at the output side of the Y register 1, and the contents $y$ of the Y register 1 are added to an R register 3 connected at the output side of said gate circuit 2 every time a gate signal $\Delta t$ is supplied at the gate input side of said gate circuit 2. In relevance to an extractable output $\Delta z$ from the output side of the R register 3, depending upon the result of the addition in R register 3, a +1 output is extracted when the R register 3 results in an overflow state and a −1 output results in an underflow state. Thus, suppose the number of output $\Delta z$ from the R register 3 per unit time to be $dz$, then $dz$ will be proportional to the product of $dt$ the number of gate signal $\Delta t$ per unit time and $y$ the content of Y register 1. In other words, the relation represented by the following equation (1) holds true.

$$dz = ydt \quad (1)$$

This type of computation can be performed by using a digital differential analyzer. The circuit shown in FIG. 1 obeying this principal computation can be simplified as shown in FIG. 2, and function signals representing two dimensional curves more often used for example in the aforementioned machine tool operation can readily be realized, and the numerical control performed by utilizing said function signals is well known. In FIG. 2, a block designated by a reference numeral 4 incorporates Y register 1, gate circuit 2, and R register 3 as shown in FIG. 1.

As is well known, by using a combination of two integrators 4 and 5 as shown in FIG. 3, for example, a function generator capable of generating a signal representing a linear function $$y = \frac{y_0}{x_0} \cdot x \quad (2)$$

can be realized. Similarly, as shown in FIG. 4, a function generator capable of generating a signal representing a circular function $$x^2 + y^2 = x_0^2 + y_0^2 \quad (3)$$

can be realized. The circuit 6 designated by a symbol (−1) in FIG. 4 means a sign inverter which inverts the sign of the signal $dx$ extracted from the integrator 4.

Now, expressing the computation shown in FIG. 3 in the form of said equation (1), we have the following equation (4), $$\left.\begin{array}{l} dx = x_0 dt \\ dy = y_0 dt \end{array}\right\} \quad (4)$$

and by integrating output pulse train $dx$ and $dy$ using for example, a servomotor, the carriage of a machine tool can be driven along the straight line indicated by said equation (2). Furthermore, expressing the case shown in FIG. 4 in similar manner, we have the following equation (5), $$\left.\begin{array}{l} dx = -ydt \\ dy = xdt \end{array}\right\} \quad (5)$$

and by solving this equation (5) the result will be a circular function as shown by said equation (3). In other words, by introducing at the time of computation onset in equation (5) the values $y = y_0$ and $x = x_0$ as the initial conditions, the equation (3) is obtainable as the result, in which case a cutter of the machine tool will trace a circular locus revolving counterclockwise. Further, when the sign inverter designated with the symbol (−1) is connected at the output side of integrator 5 that is in the side from which the $dy$ signal is extracted, the cutter will trace a circle revolving in the direction opposite to the case of FIG. 4. Thereby, the linear speed, i.e., the feeding speed of the cutter, both of the straight line and circle generated in this manner will be given by the following equation (6).

$$ds = \sqrt{dx^2 + dy^2} = \sqrt{x_0^2 + y_0^2}\, dt \quad (6)$$

In other words, suppose the cutter advances along a straight line from the origin (0, 0) to a point $(x_0, y_0)$ on the $x$, $y$ coordinates, then the speed of the cutter is proportional to the length of said straight line $L$ represented by the following equation (7)

$$L = \sqrt{x_0^2 + y_0^2} \quad (7)$$

and, in addition, is proportional to the number of pulses of the gate pulse $dt$ per unit time. In like manner said equation (7) is valid also in the case of a circle. In this case $L$ means the radius of the circle.

In the case of said machine tools or the like, it is desirable to maintain the feeding speed of the cutter to a value as constant as possible, hence, in order to maintain the linear speed $ds$ expressed by said equation (6) at a given speed $V$ per unit time, it is evident that the objective can be attained by controlling beforehand the gate pulse $dt$ train in inverse proportion to $L$ as in the equation (8)

$$dt \propto \frac{V}{L} \quad (8)$$

In other words, as is evident from said equation (7), since the value of $L$ is available for computation from initial conditions $x = x_0$ and $y = y_0$ in advance to the onset of calculation, it is apparent that the locus of the cutter motion with a constant linear speed can be obtained by determining $dt$ in agreement with $L$ to satisfy said equation (8). In the practices to date, the pulse signal $dt$ was determined such as to satisfy the relationship in said equation (8) by controlling a pulse generator which generates the signal $dt$. However, when $L$ has a small value the pulse repetition rate of the signal $dt$ needs to be extremely high while the reverse is true for a large value of $L$. It is technically very difficult to obtain a pulse generator capable of varying the number of pulse iteration of the $dt$ in such an extremely wide range as required in the above equation (8).

SUMMARY OF THE INVENTION

Generally speaking, according to the present invention, time pulses to be applied to a digital differential analyzer are intermittently eliminated by a gate circuit controlled by a reset input of a flip-flop circuit. The reset terminal of the flip-flop circuit receives speed control pulses corresponding to a predetermined machining speed and the set terminal thereof receives an output from an integrator having a register with contents in accordance with a machining distance of a machine tool. As an integral output corresponding to said register contents is obtained from the integrator, the clock pulses can be intermittently eliminated in a manner inversely proportional to the machining distance, thus providing a constant machining speed.

DETAILED EXPLANATION OF THE INVENTION

Figure 1:
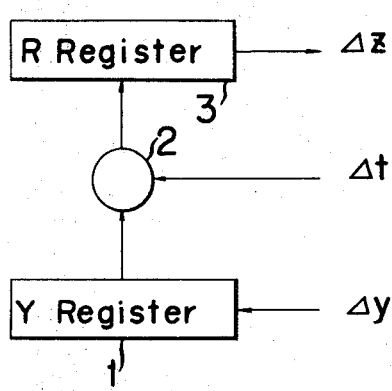
FIG. 1 shows a block diagram exhibiting the calculation principle of a conventional digital differential analyzer.
Figure 2:
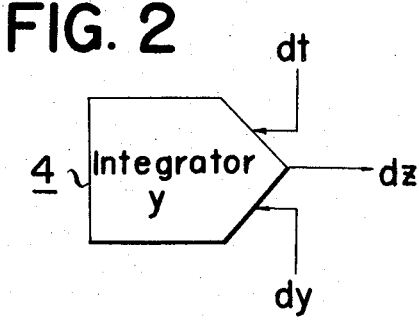
FIG. 2 shows a block diagram of FIG. 1.
Figure 3:
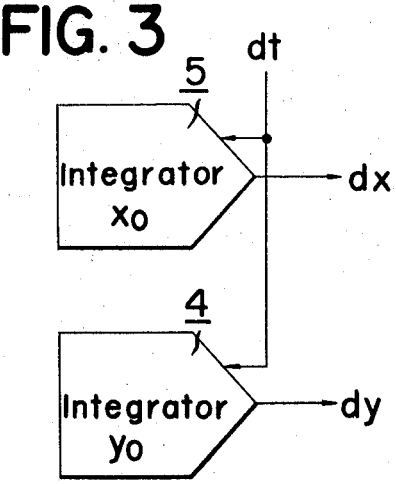
FIG. 3 shows a block diagram exhibiting the case of a generation of a linear function using the composition shown in FIG. 1.
Figure 4:
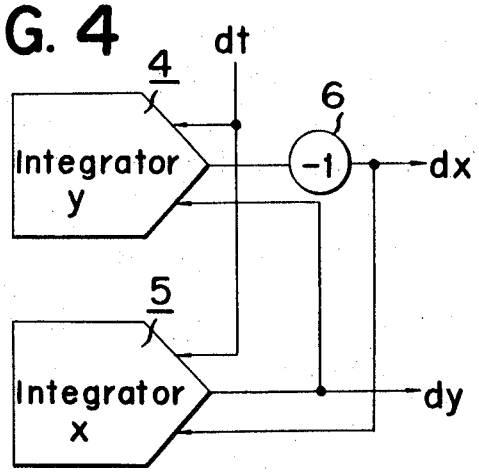
FIG. 4 shows a block diagram exhibiting similarly the case of the generation of a circular function.
Figure 5:
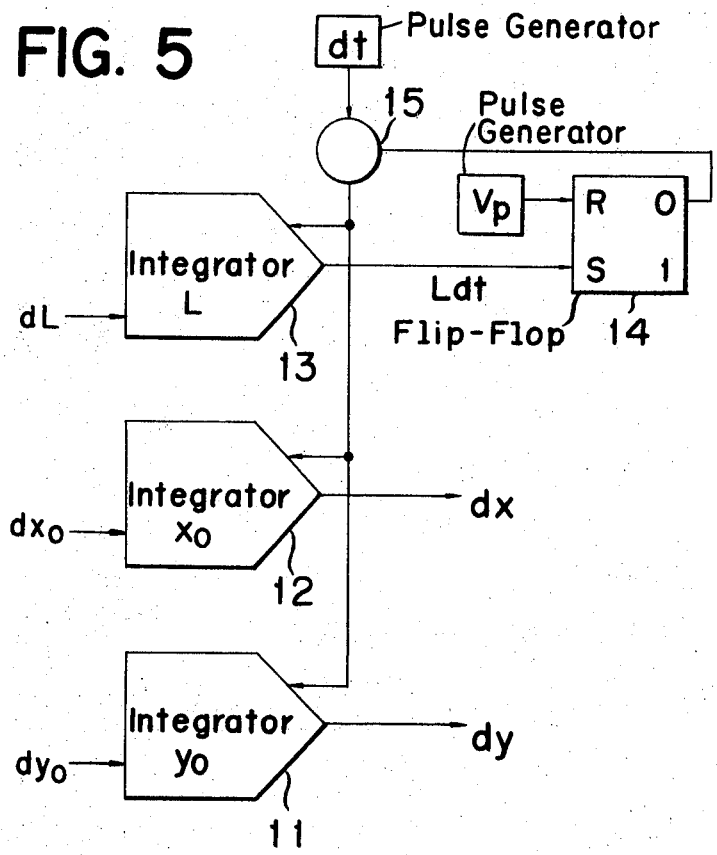
FIG. 5 shows a block diagram for delineating an embodiment of this invention.

An embodiment of this invention will be described with reference to FIG. 5 of the drawings. Three integrators, for example, integrators 11, 12 and 13 in FIG. 5 are provided. Each of said three integrators 11, 12 and 13 are of exactly the same composition as that shown in FIG. 1 and a detailed explanation of them will be omitted here. Among the three integrators 11, 12 and 13, the integrators 11 and 12 are connected so as to compose a function generator from which the pulse signals $dx$, $dy$ expressing a linear function are extracted. The outputs $dx$ and $dy$ are applied to two pulse motors (not shown) respectively. These pulse motors are connected to a machine tool driving mechanism via a gear assembly (not shown) and are rotated through a predetermined angle when they receive said pulses $dx$, $dy$, thus driving said machine tool along a predetermined path, for example, linear path to be machined. On the other hand, the other integrator 13 includes in its storage register the contents corresponding to a length $L$ of a line along which a cutter of a machine tool is to move and thereby provides an output pulse signal $Ldt$ related to the length $L$ of that line. The output signal $Ldt$ of the integrator 13 is fed to the set terminal S of a flip-flop circuit 14. As a pulse representing $Ldt$ is fed to said terminal S, the output of the "1" side of the flip-flop circuit 14 will be "1" and the output of the "0" side shown in the drawing will be "0." A gate circuit 15 is connected to the output terminal of this flip-flop circuit 14, and when the output of the "0" side terminal of said flip-flop circuit 14 changes $dt$ pulses of a constant period applied to the gate circuit 15 are transferred and fed to integrators 11, 12 and 13 respectively, on the other hand, when the output is "0," $dt$ pulses are blocked thus causing integrators 11, 12 and 13 to cease their calculations. Moreover, there is fed to the reset terminal R of said flip-flop circuit 14 a pulse train $V_p$ which corresponds to a desired cutter linear speed $V$, by means of which flip-flop circuit 14 is caused to reset the stage, the gate circuit 15 opens, feeds $dt$ pulses to integrators 11, 12 and 13, and start the calculation for the generation of the linear function.

The present embodiment will now be explained in further detail. The value $L$ varies in accordance with the machining length, and it is necessary to use a register with a large number of bits for processing various machining length by only one register. The pulse repetition rate of said signal $dt$ will be raised as high as the integrator permits. Accordingly, the values $L$, $x_0$ and $y_0$ will be shifted and so set in the respective registers 11, 12 and 13 shown in FIG. 5 so that the calculation speed of the respective integrators 11, 12 and 13 will be maximum. For example, assuming that the Y register is of $n$ orders, the highest order of $L$ will be shifted over to the highest order of the Y register. If for a certain actual moving distance of the cutter the pulse repetition rate is shifted M orders high the apparent $L$ will be as shall be noted later of the value of $2^M L$, then correspondingly to this order M of initial values $x_0$, $y_0$ of integrators 11 and 12 will be similarly shifted by the amount of $2^M x_0$ and $2^M y_0$ respectively. Consequently, what can be extracted is a signal with a fixed direction but with a speed only of $2^M$ times the signal, for example, by expressing a linear function generated by integrators 11, 12 and 13, or the signal, in the case of circular function, with the radius of said circle and linear speed enhanced by $2^M$ times. Therefore, since said $L$ is proportional to the radius of the circle or the length of the straight line, the pulse iteration extracted from the integrator 13 will be of the value $2^M$ times the linear speed. This pulse output from the integrator 13 is fed to the S terminal at the set side of flip-flop circuit 14, and "0" output of the "0" side terminal is fed to gate circuit 15, then the gate circuit 15 opens upon the arrival of one pulse of the speed pulse $V_p$, and integrators 11, 12 and 13 operate, while in the case of the arrival of the output pulse proportional to $L$, the flip-flop circuit 14 gets inverted and integrators 11, 12 and 13 cease their calculations. In other words, the output pulse $Ldt$ of the integrator 13 is in one to one correspondence with the speed pulse $V_p$, and the control for the constant cutter speed can be actualized. Additionally, the calculation speed of the integrator 13 is raised so that one pulse of the output pulse $Ldt$ of the integrator 13 can be extracted without fail between the pulse interval of said speed pulse $V_p$. After all, this is the reason for the said factor of $2^M$. In this manner, even if the pulse rate $dt$ is constant, because the gate circuit 15 is controlled by the output pulse $Ldt$ of integrator 13, the triggered duration of the gate circuit 15 differs depending upon the magnitude of $L$, thus the pulse number of the time input signal $dt$ is held under control at the desired pulse repetition rate $V_p$ since the gate prevents the passage of undesired pulses.

As described hereinabove, in accordance with this invention, because of the fact that the pulse repetition rate unit time pulse $dt$ number fed to the gate circuit is held constant, the operation of the integrators is elevated as high as possible, and said pulse is caused to be eliminated in compliance with $L$ by using both the moving distance $L$ of the cutter and the assigned cutter speed $V_p$, even if the iteration of the time input signal $dt$ is held constant, the speed pulse for linear speed delivered by the same will be of the constant period as defined by $V_p$, and substantially this is equivalent to varying of the frequency of the signal $dt$ in a wide range, thus it makes it possible to attain the nearly constant speed for the cutter employing a simple composition, and applying this on a machine tool, as a director device for a numerical control system which is capable of high precision and reliability.

Figure 6:
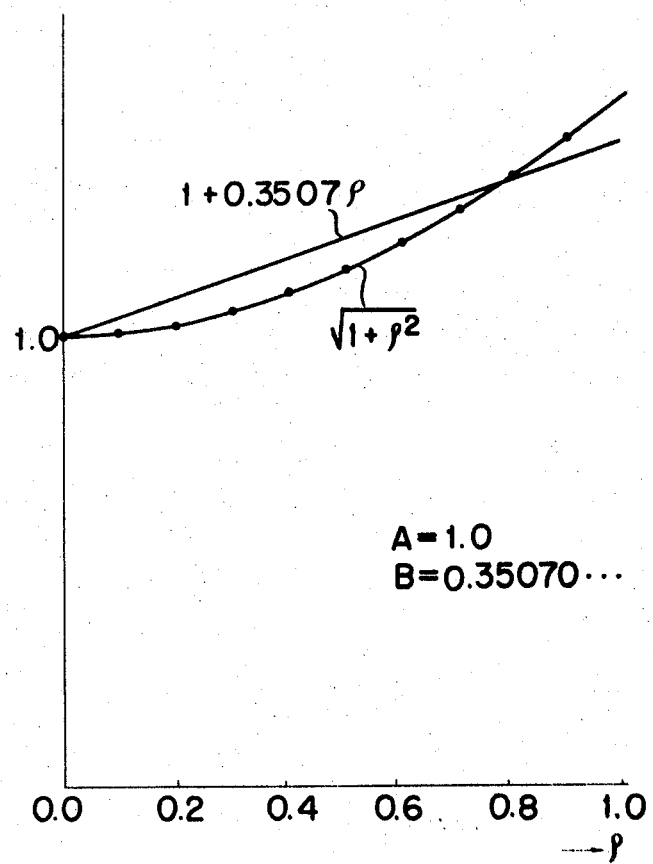
FIGS. 6 and 7 show diagrams for numerical demonstration of embodiment shown in FIG. 5.
Figure 7:
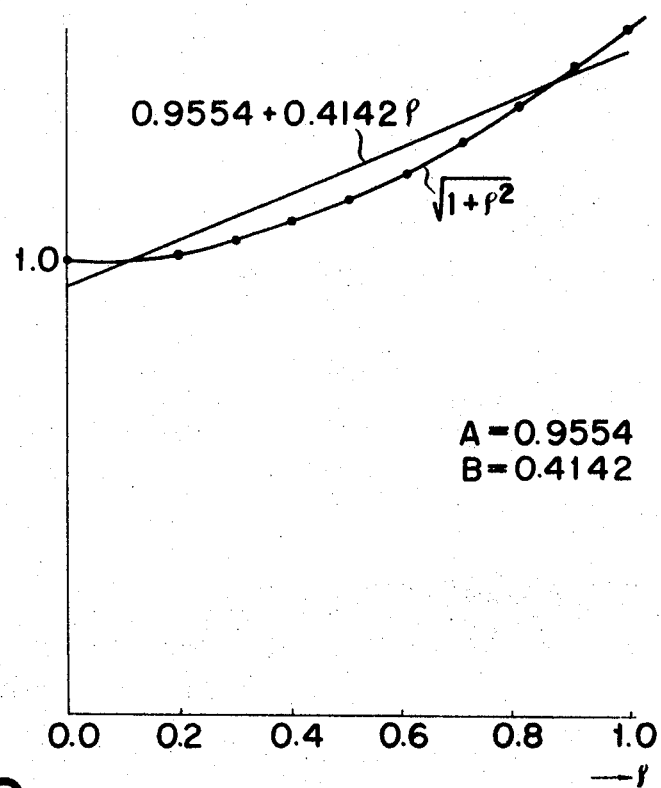

Next, an explanation pertaining to computation by this invention for obtaining a value $L$ to be given to the $L$ register shown in FIG. 5 and mentioned in equation (7) shall be presented. First, for the generation of the linear or the circular function, only the data required by the interpolator contemplated herein are initial values $x_0$, $y_0$, and the quantity of length $L$ as appears in said equation (7) is not initially required as is obvious from the following explanation. By conducting computation for $L$ in the following manner, a computation particularly simplified in this respect is feasible. To be brief, when the quantity $x_0 \geq y_0$ in said equation (7) can be obtained, we have $$L = x_0 \sqrt{1 + \frac{y_0^2}{x_0^2}} = x_0 \sqrt{1+\rho^2} \qquad (9)$$

where $$\rho \equiv \frac{y_0}{x_0}, \ |\rho| \leq 1$$

that is to say $$l = \sqrt{1+\rho^2}, \ |\rho| < 1 \qquad (10)$$

and $L$ can be readily computed. An approximation for the quantity $l$, its value $l'$ can be expressed by the equation below.

$$l' = A + B \qquad (11)$$

and by selecting adequate values for $A$ and $B$ as shall be noted later the possible difference between $l$ and $l'$ will be less than 5 percent at maximum. $A, B$ therein are constants. As indicated in the equation (6) and equation (7), the equation (11) is best approximated to the equation (10) by referring to Chebyshev's Formula. As of the result, in the case of FIG. 6

$$\left.\begin{array}{l} A=1.0 \\ B=0.35070 \end{array}\right\} \quad (12)$$

and in the case FIG. 7

$$\left.\begin{array}{l} A=0.9554 \\ B=0.4142 \end{array}\right\} \quad (13)$$

Figure 9:
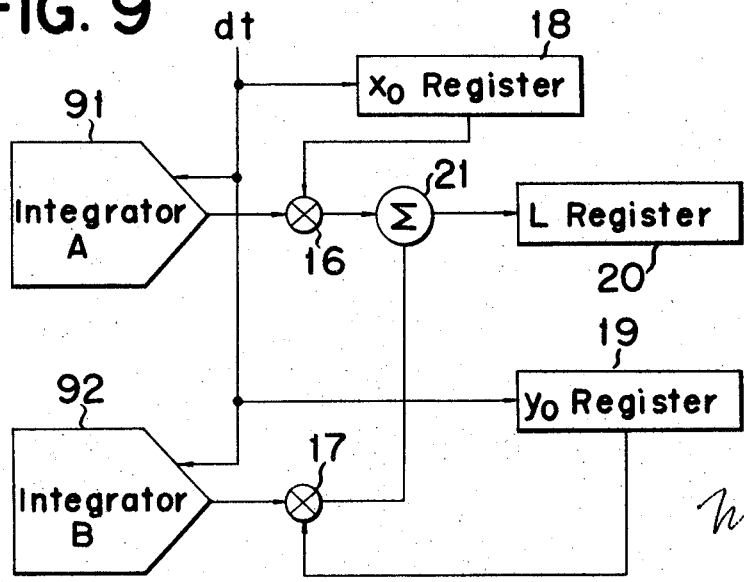
FIG. 9 shows a block diagram delineating the case wherein a circuit, which realizes the computation in FIG. 8 and computes it is composed.

It will be understood that the values $A, B$ thus obtained are converted into digital signals and then set into the registers provided in the integrators in FIG. 9 respectively. As to the values in equations (12) and (13), the figures following the decimal point will continue infinitely, however, they may be determined in the number suitable to the precision required by the control system say for a machine tool. Consequently, in the case of either equation (12) or equation (13), $l'$ permits a precision within 5 percent as compared to $l$. That is to say as $L'$ the approximation of $L$, the equation below can be furnished.

$$L'=Ax_0+By_0, \quad x_0 \geqq y_0$$

or $$L'=Ay_0+Bx_0, \quad y_0 > x_0 \quad (14)$$

Figure 8:
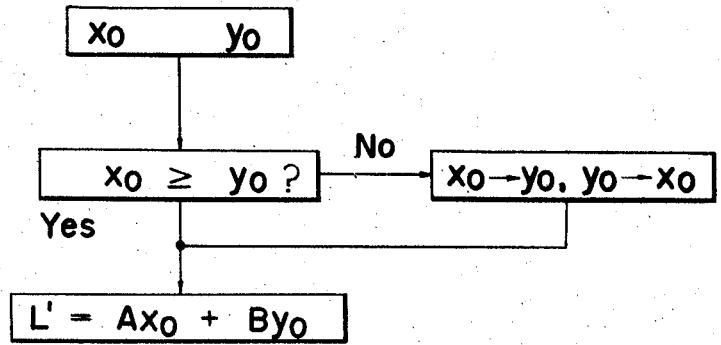
FIG. 8 shows a flow chart indicating a numerical computation procedure of the content in FIGS. 6 and 7.
Figure 10:
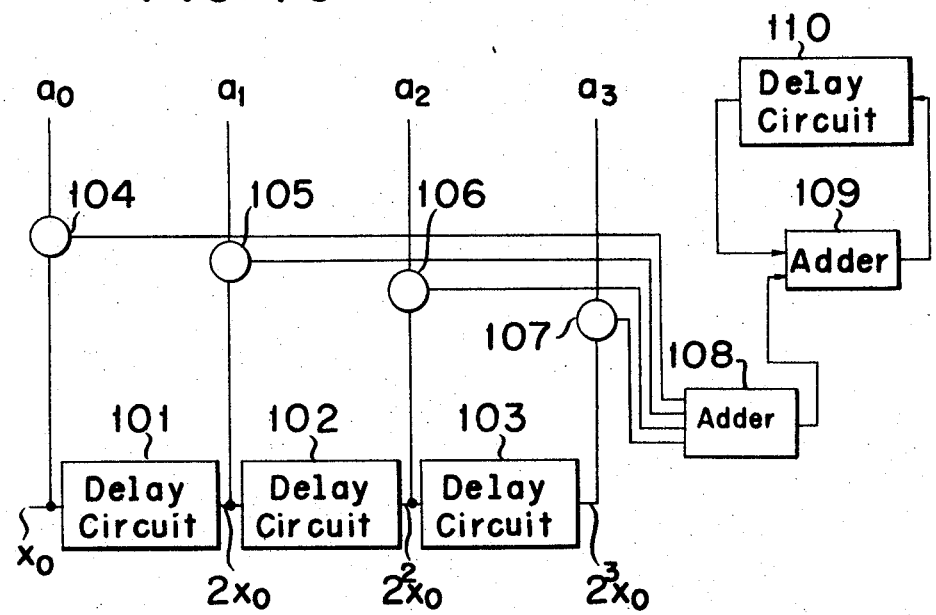
FIG. 10 shows a schematic diagram for delineating of other computation circuit for the realization of the computation in said FIG. 8.

At this stage presenting a flow chart for the calculation of $L'$ in FIG. 8, one example of the circuit for the case of the computation using a known integrator is shown in FIG. 9. In other words, when the signal $dt$ by the amount of $x_0$ count is fed to register 18, by applying the output of this register 18 to the gate circuit 16 and by blocking the output of $Adt$ with the gate circuit 16, a value of $Ax_0$ is added to the $L$ register. Similarly, by extracting a $Bdt$ output from the $Y_0$ register and performing an addition with an accumulator gate 21 via a gate circuit 17, the contents in correspondence with said equation (14) can be obtained in the $L$ register 20. Moreover, although it was indicated in FIG. 8 to interchange $x_0$ and $y_0$ when $x_0 < y_0$, $A$ and $B$ may well be interchanged instead. Another example of computation circuit for $L$ is shown in FIG. 10 in which case a delay circuit 110 is used as a memory element and an adder 109 is connected to it. Adder 9 is fed by an OR gate 108 which in turn is fed by circuits designated by the reference numerals 104 to 107 which are all gate circuits. In this case a circuit to delay by one bit the signal expressing $x_0$ in number, for example, consists of delay elements 101 to 103, and since the outputs of each delay elements 101 to 103 are a series of binary numbers with respect to their inputs, they form a series of two times the input (See FIG. 10). Furthermore, the signal train $a_0$ to $a_3$ is $A_0$ expressed in a series binary number, and $a_0$ is the lowest order and supposing $A_0$ to be of 4 orders, $a_3$ is the highest order. In this case the means to express $A_0$ in term of a series binary number could be of any known type, so its explanation is omitted herein. Suppose $a_0$ is 1, then it will add $x_0$ in the delay circuit 110 via an adder circuit 108, whereas if $a_1$ to $a_3$ is 1, $x_0$ will be added each delaying by 1 bit to 3 bits, and if $a_0$ is 0, $x_0$ will not be added. Likewise, if $a_1$ to $a_3$ are 0, no addition will be effected. By applying one word time of $x_0$ in this manner, a quantity $Ax_0$ will be stored in the delay circuit 110, and by adding $BY_0$ later in similar manner, a computation circuit for $L'$ can be realized. By using the storage register in the integrator 13 of FIG. 5 the contents equivalent to $L'$ obtained in this manner, the same implementation is possible. In other words the values $A, B$ can be considered as constants $K, K'$ where $K$ represents the one value when $K'$ represents the other value.

Therefore, although for the purpose of explaining the invention particular embodiments thereof have been shown and described, obvious modifications will occur to a person skilled in the art, and this invention is not to be limited to the exact details shown and described.

I claim:

1. In a digital differential analyzer digital machine tool control system wherein function generator means are used to drive motor means, said motor means being used to drive a machine tool, the improvement therein wherein an interpolator is provided for said digital control system, said interpolator comprising in combination:

a. a first clock pulse generator generating clock pulse signals having a high repetition rate;

b. a gate circuit gating said clock pulse signals;

c. an integrator including a register with the contents thereof corresponding to a machining distance of said machine tool to be controlled by said system, said integrator generating an integral output in accordance with said register contents, said function generator means and said integrator each respectively receiving said pulse signals gated by said gate circuit;

d. a second clock pulse generator generating speed control pulse signals with a predetermined repetition rate according to a desired machining speed; and, e. a flip-flop circuit having a reset terminal receiving said speed control pulse signals, a set terminal receiving said integral output and an output terminal connected to a control terminal of said gate circuit, whereby clock pulses can be eliminated in a manner inversely proportional to said machining distance, thus providing a substantially constant machining speed.

2. A system according to claim 1, wherein said flip-flop circuit assuming its first stable state upon the reception of the output from said integrator, and assuming its second stable state upon the reception of the speed control pulse signal from said second clock pulse generator.

3. A system according to claim 1, wherein said function generator means includes first and second integrators arranged so as to generate a linear function signal upon the reception of said first clock pulse signal.

4. A system according to claim 1, wherein said function generator includes two integrators and an inverter, being so arranged as to generate a circular function signal upon the reception of first clock pulse signal.

5. A system according to claim 1, wherein said function generator means includes two integrators including storage registers each of which respectively having contents denominated $A, B$, two gate circuits each of which transfers the integrator output from said two integrators to the storage register in said integrator, and an additive means for obtaining an approximation of the distance $L$ between the origin and a point $(x_0, y_0)$ in the rectangular coordinate system consisted of $x$ and $y$ axes, said additive means including an $x_0$ register and a $y_0$ register which generate signals of closure of said two gate circuits when the first clock pulse signal is supplied in the count corresponding to $x_0$ and $y_0$, and so arranged to calculate an equation $$Kx_0 + 'y_0$$

where $K$ and $K'$ represent the contents of the $A$ and $B$ registers the one representing the one $A$ when the other represents the other register where $A, B$ are constants, so as to feed the result of this calculation to said storage register in place of the contents in correspondence with the relative feed distance $L$ of the work piece and the machine tool.

6. A director device according to claim 1, wherein said function generator means includes gate circuits of predetermined number so that these may be impressed to each respective bits of signals, each expressed in a serial binary number with the bits predetermined in correspondence with values $A, B$ either of which can be represented as constants $K, K'$ so that when $K$ represents the one, $K'$ represents the other and which satisfy the equation $$Kx_0 + 'y_0$$

which is used to obtain an approximation for distance $L$ between the origin of a rectangular coordinate provided with $x$ axis and $y$ axis and a point $(x_0, y_0)$ of said coordinate, a circuit arrangement consisted of a plurality of delay elements connected in series for the purpose of impressing signals to said gate circuits relative to said $x_0$ and $y_0$ directly and sequentially with a delay of one bit, an OR circuit which transfers the output of each of said gate circuits, and an additive means consisting of a delay circuit to which said output of said OR circuit is applied via an adder and so arranged as to calculate the approximation equation $$Kx_0 + 'y_0$$

by adding the OR circuit output and the delay circuit output by means of said adder so that the result of this calculation is impressed on said storage register in place of the contents in correspondence with the relative feed distance $L$ of the work piece and the machine tool.

7. In a digital differential analyzer digital machine tool control system wherein first and second integrators are used to drive motor means, said motor means being used to drive a machine tool, the improvement therein wherein an interpolator is provided for said digital control system, said interpolator comprising in combination:
   a. a first clock pulse generator generating clock pulse signals having a high repetition rate;
   b. a gate circuit gating said clock pulse signals;
   c. a third integrator, including a register with the contents thereof corresponding to a machining distance of said machine tool to be controlled by said system, said third integrator generating an integral output in accordance with said register contents, said first second and third integrators each respectively receiving said pulse signals gated by said gate circuit;
   d. a second pulse generator generating speed control pulse signals with a predetermined repetition rate according to a desired machining speed; and,
   e. a flip-flop circuit having a reset terminal receiving said speed control pulse signals, a set terminal receiving said integral output and an output terminal connected to a control terminal of said gate circuit, whereby clock pulses can be eliminated in a manner inversely proportional to said machining distance, thus providing a substantially constant machining speed.